US006941690B2

(12) United States Patent
McCambley, Jr.

(10) Patent No.: US 6,941,690 B2
(45) Date of Patent: Sep. 13, 2005

(54) DISPLAY COVER FOR VEHICLE EXTERIOR SIDEVIEW MIRRORS

(76) Inventor: William Norbert McCambley, Jr., 105 Brantford Cir., Horsham, PA (US) 19044

( * ) Notice: Subject to any disclaimer, the term of this patent is extended or adjusted under 35 U.S.C. 154(b) by 0 days.

(21) Appl. No.: 10/338,320

(22) Filed: Jan. 8, 2003

(65) Prior Publication Data

US 2004/0128884 A1 Jul. 8, 2004

(51) Int. Cl.[7] .......................... G09F 21/04; G09F 17/00
(52) U.S. Cl. ............................. 40/591; 40/603; 40/666
(58) Field of Search .......................... 40/591, 593, 603, 40/604, 666; 150/166; D12/403; 359/871, 872, 873; 248/302, 304, 466, 475.1

(56) References Cited

U.S. PATENT DOCUMENTS

| | | | | |
|---|---|---|---|---|
| 2,637,246 A | * | 5/1953 | Wolk | 359/608 |
| 2,990,637 A | * | 7/1961 | Saben | 40/643 |
| 4,103,860 A | * | 8/1978 | Haas et al. | 248/467 |
| 4,834,157 A | * | 5/1989 | Smith | 150/166 |
| 4,915,488 A | * | 4/1990 | Lambert et al. | 359/608 |
| 5,133,141 A | * | 7/1992 | Bane | 40/593 |
| 5,815,966 A | * | 10/1998 | Vestevich | 40/217 |
| 5,946,838 A | * | 9/1999 | Lanoue | 40/607.14 |
| 6,325,121 B1 | * | 12/2001 | Hudnall | 150/166 |
| 6,444,595 B1 | * | 9/2002 | Elkouh et al. | 442/76 |
| 6,467,918 B2 | * | 10/2002 | Strode et al. | 359/871 |
| 6,811,269 B2 | * | 11/2004 | Strode et al. | 359/838 |

* cited by examiner

Primary Examiner—Brian K. Green

(57) ABSTRACT

An apparatus, consisting primarily of colored, dyed stretchable materials arranged solely to form display indicia, is constructed to fit onto, and substantially conform to the complex three-dimensional curvilinear shape of, a mirror housing of a motor vehicle exterior mirror. The colored, dyed stretchable material, upon installation, forms display indicia facing the front of the vehicle without obstructing the view of the mirror surface facing the rear of the vehicle. Preferred embodiments provide for removal of the apparatus without harm to the mirror housing.

1 Claim, 5 Drawing Sheets

DISPLAY COVER FOR VEHICLE EXTERIOR SIDEVIEW MIRRORS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to colored, dyed stretchable material arranged solely to form display indicia including, but not limited to, representations of national colors and flags, school colors and flags, team colors, colors commonly associated with special occasions such as birth of a baby, holidays, and weddings, as well as various fanciful designs, trademarks, and the like, on the front side of an exterior side-view mirror housing of cars, trucks, and other vehicles.

The art of displaying indicia on various parts of a motor vehicle spans to as early as the 1930s. However, the forward-facing side of a vehicle exterior side view mirror has not been used for such displays. Reasons for this include:

1. the requirement that a device to form display indicia fits a variety of sizes and shapes of side view mirror housings, also satisfying the marketing criteria that the device is simply constructed, easy to install, and reasonably priced;
2. the requirement that the device will not obstruct the mirror viewing surface, which could present a danger to driving the vehicle;
3. the requirement that the device withstands the effects of high speeds shifting its position, falling off, or making undesirable noise; and
4. the requirement that the device withstands the effects of the elements without undue deterioration.

Also, market preferences include that a device is fully and easily removable from a mirror housing.

The present invention, as differentiated herein from the references provided below and other devices known to those skilled in the art, satisfies these requirements. Accordingly, the present invention advances the field of arranging colored, dyed stretchable material to form display indicia on motor vehicles, in particular on the forward-facing side of a vehicle side view mirror.

One example of an early reference is Failing, U.S. Pat. No. 1,820,788. Failing disclosed an automobile identifying device that covered part of an automobile headlight. The device was comprised of a panel, which carried an identifying legend and extended across the face of the headlight, and a body adapted to overlap part of an automobile headlight to secure the device to the protruding headlight. Both parts were of stretchable and substantially transparent material.

Blonkvist, U.S. Pat. No. 2,182,275, disclosed a combination of a rearview mirror and a sign. The indicia on the sign faced inward, toward the driver, and the device was directed specifically to a rearview mirror situated inside the vehicle. Abrams, in U.S. Pat. No. 4,974,355, disclosed a sign to hang onto a vehicle rearview mirror, hanging from the structure that supported the mirror, with the sign facing frontward.

Bane, U.S. Pat. No. 5,133,141, disclosed a vehicle rearview mirror cover that comprises (1) a unitary, generally concave body, which includes a back surface and a socket (the latter being the interior of the semi-rigid concave body), and (2) an indicia means. The device fits over the back of a rearview mirror housing, and the device's shape is dictated by the housing shape. As disclosed and subject to this requirement, the device is semi-rigid.

The above patents are directed to rearview mirrors inside of a vehicle. They do not deal with the wind, weather, and other factors that affect the present invention, which is directed to a side view mirror disposed on either exterior side of a vehicle. Other inventions are directed to exteriorly mounted mirrors, including side view mirrors. However, none are directed to the attachment to the mirror housing and the display of indicia as disclosed and claimed herein.

For instance, Smith, in U.S. Pat. No. 4,834,157, teaches a removable cover to protect the exterior exposed surface of an automobile exterior mirror housing. The objective is to protect the surface from the elements, and from receiving scratches, etc. The device forms a pocket over the entire exterior mirror housing surface, with an open end around the actual mirror surface to allow viewing. Most of the border of the pocket's open end is defined by an elongated seam that snugly engages the mirror housing surface that surrounds the mirror surface. No claim is made to the presence or attachment of any indicia.

Lambert et al., in U.S. Pat. No. 4,915,488, disclose and claim a device for outside mirrors in which an open mesh is used as a shade screen for night driving to reduce the intensity of light from following vehicles. The objective, and limitations, including the means of attachment, differ from the present invention.

Strode et al., in U.S. Pat. No. 6,467,918, disclose and claim a foundation device for displaying indicia on an exterior mirror housing of a motor vehicle, said foundation device comprising a base of stretchable material comprising at least one art attachment area and, in some embodiments, an attached indicia platform bearing indicia, for displaying said indicia. No claim is made to use stretchable material, without an art attachment area, solely to form, rather than to hold, indicia. Further no claim is made regarding indicia that substantially conform to the complex three-dimensional curvilinear shape of many vehicle exterior mirrors.

McCambley et al., in provisional application for patent dated Feb. 7, 2002, disclose a removable cover displaying a decorative, promotional or advertising design indicia, which substantially covers the outside housing for the vehicle side-view mirror. No disclosure is made regarding a cover which only partially covers the outside housing for the vehicle side-view mirror.

Descriptions of other inventions generally in this area are found in U.S. Pat. Nos. 1,910,503, 1,927,913, 5,598,653, 6,003,996, and Belgian Patent No. 566,213.

The present invention satisfies the requirements noted above for forming display indicia on an exterior side view mirror of a vehicle. Although motorized vehicles have been in common use for almost a century, the inventor is unaware of a device such as the present invention that, in one embodiment, is designed solely to form display indicia that substantially conform to the complex three-dimensional curvilinear shape of many vehicle exterior mirrors. The references cited do not address the problem solved by the present invention, and in contrast, these references relate to different objectives, employing different limitations in their devices.

The present invention is well suited for mass-production and scale-up techniques.

BRIEF SUMMARY OF THE INVENTION

The present invention regards colored, dyed stretchable material arranged solely to form display indicia on an exterior mirror of a motorized vehicle, said indicia preferably substantially conform to the complex three-dimensional curvilinear shape of mirror housings of many vehicle exterior mirrors, do not appreciably move due to wind and weather, and face the front of the vehicle without obstructing the view of the mirror surface facing the rear of the vehicle. An end user also would want a device that is readily removable (for when the display is not desired), and does not mar the mirror housing. Finally, for production, marketing, and pricing, a device should be amenable to mass production, and one size and design should fit a relatively wide range of sizes and designs of vehicle exterior mirror housings. The present invention, in its various embodiments, achieves these objectives.

In contrast to the teachings of the prior art, one embodiment of the present invention employs a arrangement of readily installable, readily removable colored, dyed stretchable materials to a front side of a vehicle exterior mirror housing. The colored, dyed stretchable materials fit closely over a portion of the front side, and are held firmly in place by two or more clips that fasten to a portion of the mirror housing.

The colored, dyed stretchable materials are arranged to form a display indicum which faces the front of the vehicle when installed, and substantially conforms to the complex three-dimensional curvilinear shape of many vehicle exterior mirrors. The apparatus will not extend beyond the edges of the mirror housing, and so designed has been shown to withstand high speed driving without problem.

A method of connecting the apparatus to the mirror housing is described and claimed.

The present invention advances the field of arranging colored, dyed stretchable material solely to form display indicia on the front side of exterior mirror housings. Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

FIG. a 2a is a schematic view of the FIG. 1 embodiment of the present invention showing exploded views of the left side underside clip assemblies.

DETAILED DESCRIPTION OF THE INVENTION

The present invention relates to a means to form indicia which substantially conform to the complex three-dimensional curvilinear surface shape of housing assemblies of many vehicle exterior mirrors. A preferred means is to place an arrangement of colored, dyed stretchable material forming display indicia to an exterior mirror housing, said indicia viewable when so attached.

Figure 1:
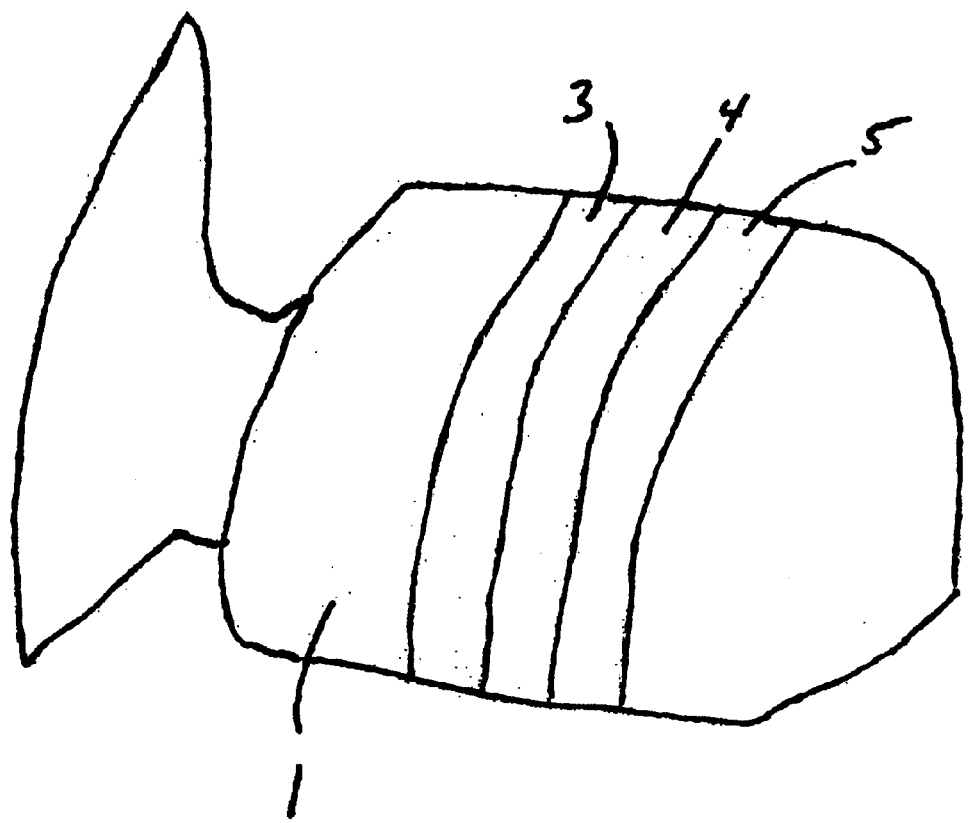
FIG. 1 is a perspective view of the display surface of the present invention assembled onto a vehicle exterior mirror housing.

FIG. 1 illustrates a typical accommodation in the fit, contoured to the front surface of the mirror housing 1, of a removable apparatus comprising three parallel colored, dyed stretchable bands 3, 4, and 5 as shown. The colored, dyed stretchable bands, typically, will stretch to sufficiently tauten them against the front surface of the mirror housing 1 shown and over a wide range of mirror sizes and shapes. By sufficiently tauten is meant the colored, dyed stretchable bands 3, 4, and 5, withstand driving at normal speeds without substantial movement of these bands from their original position.

Figures 2A, 2B, 2C:
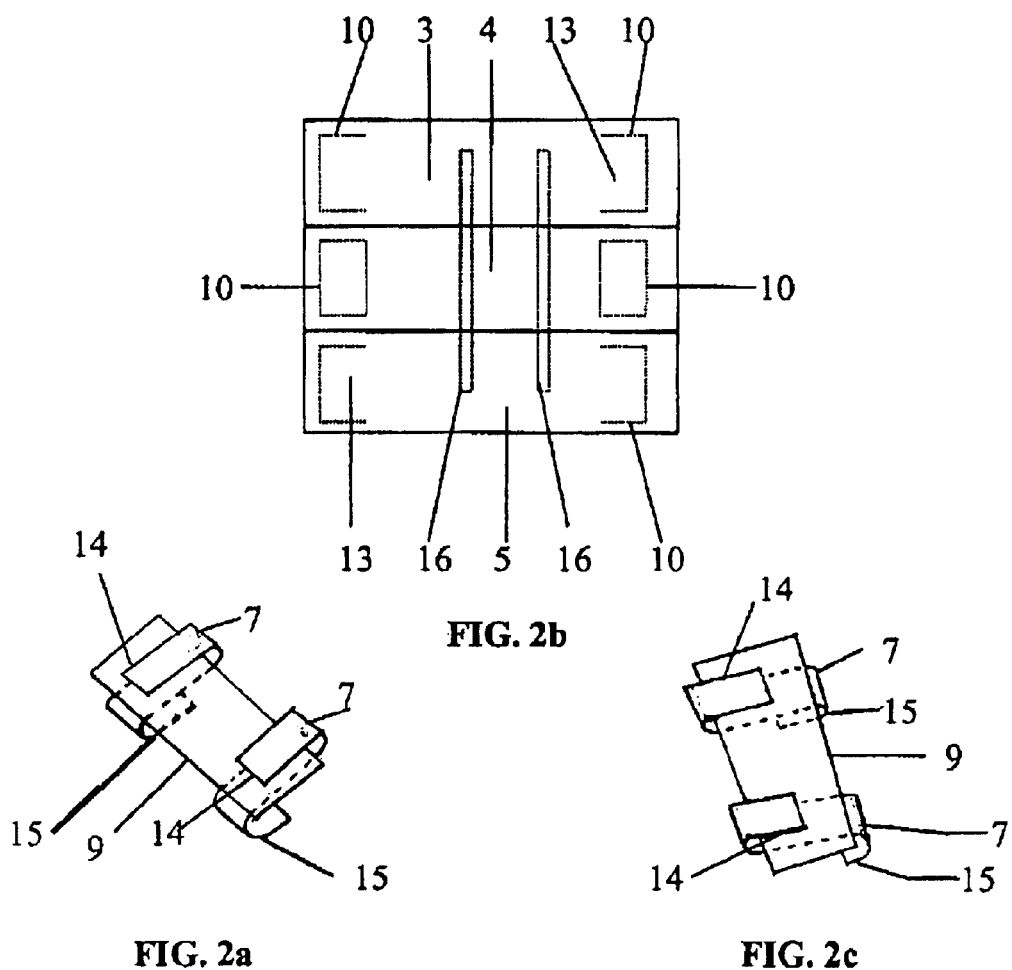
FIG. 2b is a schematic view of the FIG. 1 embodiment of the present invention showing the display surface.
FIG 2c is a schematic view of the FIG. 1 embodiment of the present invention showing exploded views of the right side underside clip assemblies.

FIG. 2b illustrates the display surface of the three parallel colored, dyed stretchable bonds 3, 4, and 5, shown in FIG. 1 with the stitching 10 required to affix the end bands 9 to the underside, non-display surface of the colored, dyed stretchable bands 3, 4, and 5, such affixation then providing the tight pocket or space 13 between the end bands and colored, dyed stretchable bands 3 and 5 into which space the topmost flange 14 of plastic clip 7 is slotted. It can be seen in FIG. 2a, that, when assembled, the bottom hook 15 of each of four plastic clips 7 project down and away from the end band 9. FIG. 2c shows this same assembly used on the right underside of the apparatus of FIG. 1. FIG. 2b also illustrates the stitching 16 on the underside, non-display surface of colored, dyed stretchable bands 3, 4, and 5. The left underside assembly in FIG 2a is stitched to the left underside, non-display surface of colored, dyed stretchable bonds 3, 4, and 5 whose display surfaces are shown in FIG. 2b. The right underside assembly in FIG 2c is stitched to the right underside, non-display surface of colored, dyed stretchable bands 3, 4, and 5 whose display surfaces are shown in FIG. 2b.

Figure 3:
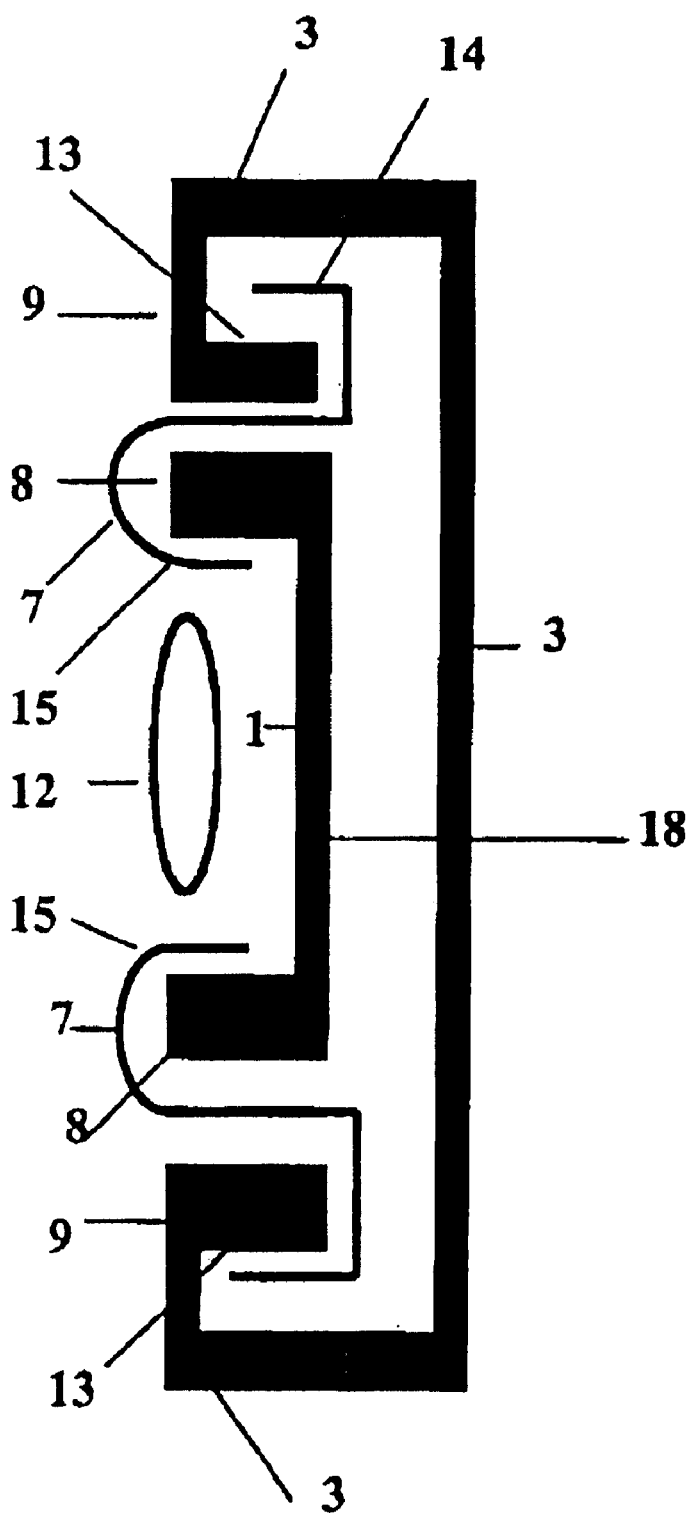
FIG. 3 is a vertical cross section of the embodiment shown in FIG. 1, as assembled to an exterior mirror housing.

FIG. 3 is a schematic partial cross section of the embodiment shown in FIG. 1 as assembled to an exterior mirror housing. End band 9 is affixed to colored, dyed stretchable band 3. Topmost flange 14 of plastic clip 7 is slotted into the pocket or space 13 formed by the affixing of end band 9 to colored, dyed stretchable band 3. Bottom hook 15 of plastic clip 7 clips onto the top and bottom mirror housing rim 8 of exterior mirror housing 1 encasing mirror lens 12.

Colored, dyed stretchable band 3 is shown to stretch from the top mirror rim 8 of mirror housing 1 taut against the front surface 18 of mirror housing 1 to the bottom mirror rim 8 of mirror housing 1.

Figure 4:
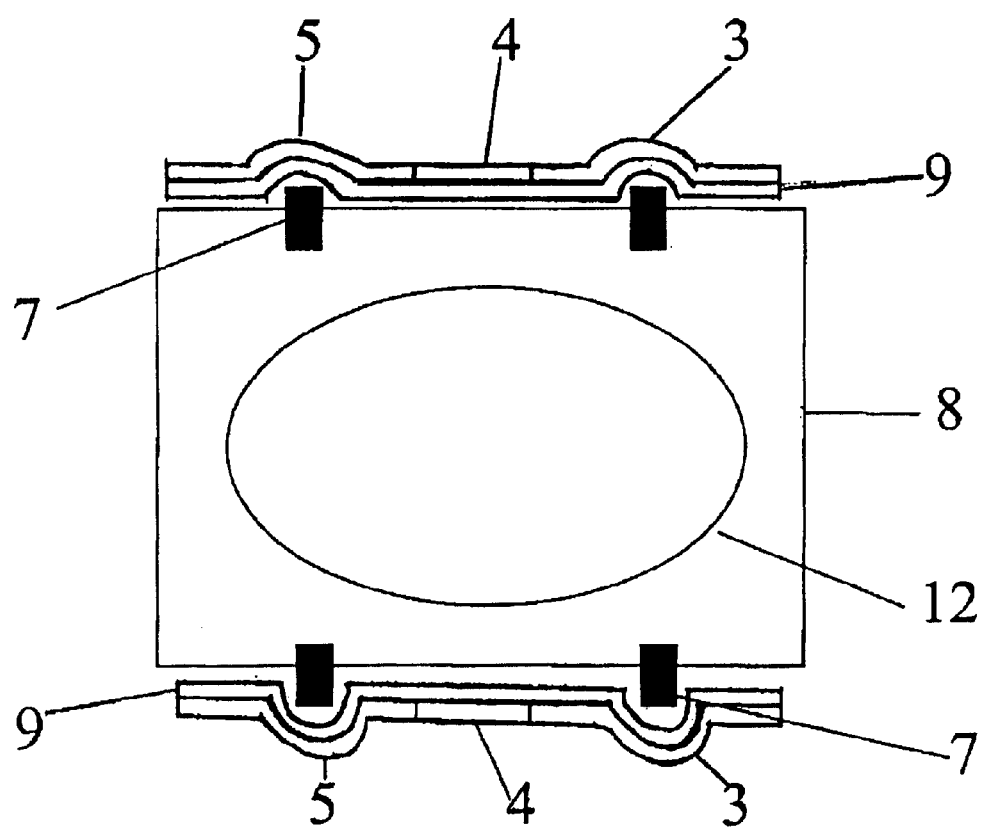
FIG. 4 is a schematic rear view of an exterior mirror housing showing the mirror housing rim, the mirror surface, and the rear sides of the clips of the embodiment shown in FIG. 1 attached to the exterior mirror housing.

FIG. 4 is a schematic view of an exterior mirror housing rim 8 as seen from the rear of the vehicle, showing the mirror housing rim 8, the mirror surface 12, and the rear sides of the clips 7, the end bands 9, and the colored, dyed stretchable bands 3, 4, and 5, of the device attached to the exterior mirror housing.

Figure 5:
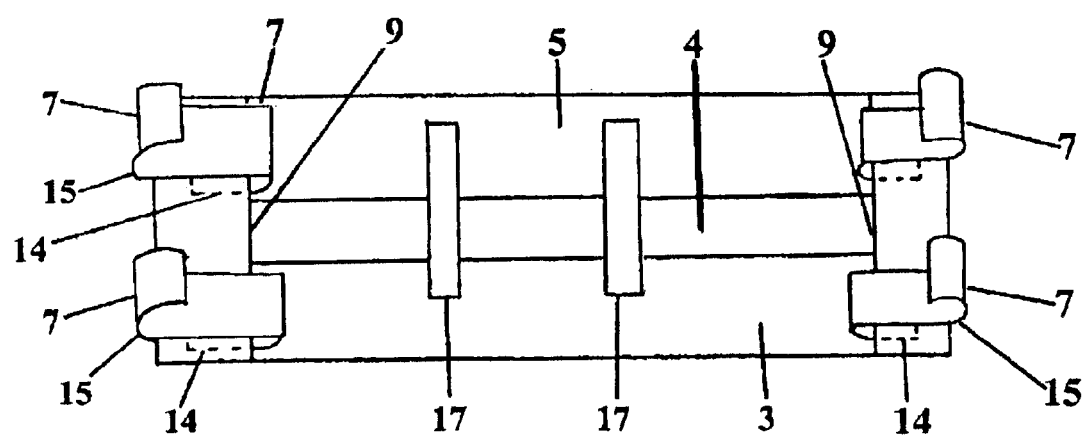
FIG. 5 is a schematic view of the underside (non-display side) of the FIG. 1 embodiment of the present invention.

FIG. 5 illustrates the underside (non-display) surface of the three parallel colored, dyed stretchable bands 3, 4, and 5, shown in FIG. 1 with the end bands 9 attached. It can be seen in FIG. 5 that, when assembled, the bottom hook 15 of each of four plastic clips 7 project away from the non-display surface of the colored, dyed stretchable bands 3 and 5. The top hook 14 of each of the four plastic clips 7 are seen to slide into spaces between the end bands 9 and the colored dyed stretchable bands 3 or 5. Transverse ties 17 are also stitched to colored dyed stretchable bands 3, 4, and 5.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

Having simply described an embodiment of the present invention, a more detailed discussion, including relevant definitions, are provided for the components of the mirror housing and embodiments of the present invention.

By indicia is meant any display of symbols, pictures, colors, or combination of these, such as are used to display or communicate. For instance, indicia include, but are not limited to: letters, numbers, words, company and/or sports team logos, school, team, or organization colors, representations of national or other flags, representations of special occasions (such as a birthday, an anniversary, a holiday), as well as combination forming fanciful designs and/or printed information, and other designs, advertisements and other displays, designs and notices, such as to evidence political, religious or other affiliations or viewpoints.

The mirror, as represented in this and other figures herein, comprises the following parts: a mirror housing, typically of metal or plastic, and forming a generally smooth, continuous structure and holding a mirror surface. Said mirror housing comprises a front side facing the front of the vehicle, a back side facing the rear of the vehicle, a proximal side which is the side nearest to the vehicle, and a distal side which is the side furthest from the vehicle.

I claim:

1. An apparatus in combination with a vehicle mirror housing comprising:

a plurality of colored, dyed stretchable bands, at least one elongated tie extending across the plurality of bands, the at least one tie attached to the plurality of bands in order to secure the bands together, a first end band directly attached to first adjacent ends of each of the plurality of bands, a second end band directly attached to second adjacent ends of each of the plurality of bands, a pocket formed on each of the ends of one of the plurality of stretchable bands, a pocket formed on each of the ends of another one of the plurality of stretchable bands, the end bands in combination with the plurality of bands forming each of the pockets, a plurality of clips, each of the plurality of clips including a top hook and a bottom hook, each of the pockets receive a respective top hook of one of the plurality of clips in order to attach each of the plurality of clips to a respective band, and wherein each of the bottom hooks of the plurality of clips engage the vehicle mirror housing, the clips securely attaching the plurality of stretchable bands to the vehicle mirror housing.

* * * * *